(12) United States Patent
Devoe et al.

(10) Patent No.: US 6,587,327 B1
(45) Date of Patent: Jul. 1, 2003

(54) INTEGRATED BROADBAND CERAMIC CAPACITOR ARRAY

(76) Inventors: Daniel Devoe, 1106 Barcelona, San Diego, CA (US) 92107; Alan Devoe, 5715 Waverly Ave., La Jolla, CA (US) 92037; Lambert Devoe, 26213 Via Luis, Laguna Niguel, CA (US) 92677

( * ) Notice: Subject to any disclaimer, the term of this patent is extended or adjusted under 35 U.S.C. 154(b) by 0 days.

(21) Appl. No.: 10/150,202

(22) Filed: May 17, 2002

(51) Int. Cl.[7] .......................... H01G 4/228; H01G 2/20
(52) U.S. Cl. ................ 361/306.3; 361/321.2; 361/308.1; 361/309
(58) Field of Search .................. 361/303, 306.1, 361/306.3, 308.1, 309, 311–313, 321.2–321.3, 329, 330

(56) References Cited

U.S. PATENT DOCUMENTS

| | | | | |
|---|---|---|---|---|
| 4,247,881 A | * | 1/1981 | Coleman | 361/302 |
| 5,576,926 A | * | 11/1996 | Monsorno | 361/303 |
| 5,978,204 A | | 11/1999 | Stevenson | 361/303 |
| 6,208,501 B1 | | 3/2001 | Ingalls et al. | 361/303 |
| 6,418,009 B1 | * | 7/2002 | Brunette | 361/306.3 |

FOREIGN PATENT DOCUMENTS

JP         2000-106320    *   4/2000

* cited by examiner

Primary Examiner—Anthony Dinkins
(74) Attorney, Agent, or Firm—Wood, Herron & Evans, L.L.P.

(57) ABSTRACT

A monolithic capacitor structure includes at least first and second plates internal to a dielectric body, the plates extending inward from opposed conductive contacts on surfaces of the body, and forming capacitor(s) therebetween. A third plate extends within said body, electrically floating relative to the exterior contacts, and forming a capacitor with the first and second plates, and further forming a capacitor with additional conductive structures connected to the conductive contacts on the body. The resulting array of combined series and parallel capacitors formed by the third plate, in conjunction with the capacitor(s) formed by the first and second plates, provides effective wideband performance in an integrated, cost-effective structure.

17 Claims, 4 Drawing Sheets

INTEGRATED BROADBAND CERAMIC CAPACITOR ARRAY

FIELD OF THE INVENTION

The present invention relates to miniature monolithic capacitors.

BACKGROUND OF THE INVENTION

The development of integrated circuits has made it possible to place many circuit elements in a single semiconductor chip. Where part or all of the circuit is an analog circuit, such as a radio frequency transmitter or receiver, audio amplifier, or other such circuit, circuit design requires lumped elements that cannot be readily realized in monolithic integrated circuits. Capacitors in particular are frequently created as separate elements from the integrated circuit. The electronic device thus typically includes monolithic integrated circuits combined with external capacitors.

For such applications, monolithic capacitors have been used. For example, single capacitors made of ceramic materials, are known in the art. These are relatively small in size and can be surface mounted to a surface mount circuit board, or glued and wire bonded to a substrate in a hybrid circuit layout.

FIG. 1A shows a lumped element model for a capacitor. In this ideal model, the capacitor provides an ideal voltage/current relationship $$i = C\frac{dv}{dt}$$

unfortunately, particularly at high frequencies, capacitors used in electronic circuits deviate substantially from this ideal relationship. These deviations are generally modeled as an equivalent series resistance and equivalent series inductance, along with a capacitance that varies over frequency in accordance with this model, a capacitor behaves as a series L-R-C circuit as illustrated in FIG. 1B. At lower frequencies, the dominant impedance is the capacitive element C; however, at increasing frequencies the impedance of the capacitive element C decreases and the impedance of the inductive element L increases; until, at the resonant angular frequency $(LC)^{-0.5}$, the inductive element becomes predominant, and the element ceases performing as a capacitor. Simultaneously, the capacitor dissipates some stored energy (typically through heating of conducting plates and traces), as represented by the series resistance R.

Capacitor design typically must compromise between capacitance value and equivalent series resistance and inductance; greater capacitance typically can be created only at the cost of increased series resistance and inductance. Accordingly, equivalent series resistance and inductance are not avoidable, and electronic design must take them into account, particularly in high frequency products such as broadband receiver/transmitters, short wave devices, and the like.

Various monolithic ceramic structures have been developed to provide relatively small capacitors for highly integrated applications. A first such structure, shown in FIG. 2A, is known as a "multilayer ceramic capacitor". This structure is formed by stacking sheets of green tape or greenware, i.e., thin layers of a powdered ceramic dielectric material held together by a binder that is typically organic. Such sheets, typically although not necessarily of the order of five inches by five inches, can be stacked with additional layers, thirty to one hundred or so layers thick. After each layer is stacked, conductive structures are printed on top of the layer, to form internal plates that form the desired capacitance. When all layers are stacked, they are compressed and diced into capacitors. Then, the compressed individual devices are heated in a kiln according to a desired time-temperature profile, driving off the organic binder and sintering or fusing the powdered ceramic material into a monolithic structure. The device is then dipped in conductive material to form end terminations for the internal conductive structures, suitable for soldering to a surface mount circuit board or gluing and wire bonding to a hybrid circuit.

The printed conductive structures are arranged in a pattern that provides one or more parallel-plate capacitors. For example, in the typical structure shown in FIG. 2A, internal plates 10 and 11 have been formed which extend from alternate sides of the combined structure. The conductive material 12 and 13 at each end forms a common connection point for each plate extending to that side. Plates 10 extend in pairs, each including an upper plate 10 and a lower plate 10' from the left side, and plates 11 extend similarly in pairs, each including an upper plate 11 and a lower plate 11' from the right side, forming parallel plate capacitors between each set of adjacent plates 10 and 11' and 10' and 11. The illustrated structure is arranged to reduce equivalent series resistance and inductance, by virtue of the plates 10 and 11 extending in pairs from each side. In other embodiments, plates extend individually from opposite sides, such as in the multilayer ceramic capacitor shown in FIGS. 7A and 7B and discussed below.

Each pair of overlapping plates 10 and 11 extending from opposite side metallizations 12 and 13, forms a parallel plate capacitor, such that the entire device forms a network of parallel connected capacitors as shown in FIG. 2B, which can be soldered to the traces 14 of a surface mount circuit board. The resulting equivalent capacitance value is relatively large for the device size, albeit subject to imperfections due to resistance in the many current-carrying conductive structures, and inductance resulting from many plates carrying currents flowing in opposite directions.

FIG. 3A shows an alternative known capacitor structure developed by Dielectric Laboratories, Inc. of Cazenovia, N.Y. and described in detail in U.S. Pat. No. 6,208,501. This structure includes a ceramic chip 20 having conductive end plates on its opposed surfaces, which is bonded by conductive epoxy 22 to conductive end terminations 24 which can then be soldered to the traces 26 on a surface mounting circuit board. As can be seen in FIG. 3B, the net effect is a single capacitor, rather than a parallel array, between the conductive ends of the device. As there is only on capacitor in this device, it has good high frequency performance (reduced resistance and inductance) but has a relatively low capacitance value.

FIG. 4A shows a second alternative capacitor structure developed by American Technical Ceramics Corporation and described in detail in U.S. Pat. No. 5,576,926. This structure includes a layered ceramic chip having an internal conductive plate 30 positioned to overlay conductive plates 32 and 33 extending along an outer surface of the device from conductive end terminations 34 and 35. As before, the conductive end terminations may be readily soldered to the traces 36 of a surface mount circuit board. As seen in FIG. 4B, the net effect is a series combination of two capacitors, between the conductive ends of the device. As in this case there is a series combination of capacitors (which has a lower capacitance value than either capacitor individually), the device has good high frequency performance but relatively low capacitance value.

A third alternative capacitor is shown in FIG. 5A. Here, the ceramic chip 20 with opposed conductive surfaces, shown in FIG. 3A, has been mounted directly to the trace 40 of a hybrid circuit device. The opposed side of the capacitor has been wire bonded through wire bond, to the opposite trace 44 of the hybrid device. In this case, the equivalent circuit diagram, and performance issues are the same as those with regard to the capacitor of FIG. 3A.

A final alternative capacitor is shown in FIG. 6A. Here, a series capacitor has been formed between metallizations 51, 52 and 53 that are strictly on the outer surfaces of a ceramic chip 50. This alternative is similar to the device shown in FIG. 4A, but the internal metallization has been moved to the outer surface. This device is less complex to manufacture than the device of FIG. 4A, but provides lower capacitance value owing to the distance between the metallization layers 51 and 53 and the opposed metallization layer 52.

As can be seen, each known structure represents a tradeoff between capacitance value and broadband performance. One known approach to managing series resistance and series inductance, is to parallel connect two capacitors, such as shown in FIG. 7. In FIG. 7, a larger value capacitor C1, chosen for its large capacitance value, is connected in parallel to a smaller value capacitor, chosen for its small equivalent series resistance. As will be appreciated, this circuit exhibits multiple resonant frequencies, a first at the frequency $(L1C1)^{-0.5}$, and a second at the frequency $(L2C2)^{-0.5}$. Typically the larger valued capacitor C1 would have the larger series resistance and inductance value and thus the lower resonant frequency, whereas the smaller valued capacitor C2 would be chosen for high frequency performance resulting from low series resistance and series inductance values. At low frequencies, the larger value of C1 will produce acceptable performance, whereas a higher frequencies, where C1 behaves increasing less like a capacitor and more like an inductance, C2 will be below its resonant frequency and perform well as a capacitor throughout the frequency of interest.

The parallel capacitor approach has been utilized in conjunction with ceramic chip capacitors, to improve the high frequency performance of those capacitors. Specifically, referring to FIG. 8A, one known approach to forming a broadband ceramic capacitor structure, uses a multilayer capacitor such as that described above with reference to FIG. 2A, stacked above and soldered or bonded to a single layer, high frequency capacitor such as that described above with reference to FIG. 3A. The resulting combined structure is wave soldered or bonded together with epoxy, producing a parallel combination of low- and high-frequency capacitors seeking to achieve broadband performance. A second known implementation of this concept is shown in FIG. 8B. There, one of the side terminals of a multilayer capacitor such as described above with reference to FIG. 2A, is tilted against the upper surface of a single-layer, high frequency capacitor such as that described above with reference to FIG. 6A. The upper surface of the single-layer capacitor thus forms a first terminal of a parallel capacitor combination, that is wire bonded to a circuit board trace 36 in the manner described above with reference to FIG. 5A. The opposite side terminal of the multi-layer capacitor and the bottom surface of the single-layer capacitor are connected to a second trace 36 of the circuit board, thus forming the second terminal of the combined parallel capacitor combination.

While parallel capacitor combinations such as shown in FIGS. 8A and 8B have been used with some success in commercial devices, these combinations suffer from a number of drawbacks. First, the measured capacitance of these parallel combinations exhibit variations (resonances and dropouts), likely due to a mismatch between the resonances of the effective L-R-C circuits that are created by the parallel connected capacitors. Furthermore, the upper frequency response of even these parallel combinations may not meet the requirements of very wide band (GHz) devices in current use. Also, the mechanical stacking of dual ceramic capacitors in the manner shown is cumbersome and expensive to implement in mass production, and increases the overall height of the circuit board assembly above that of a board having only single ceramic capacitors.

There accordingly is a remaining need for a broadband capacitor meeting the performance needs of modern wideband circuits, while maintaining the size and cost efficiencies of existing ceramic capacitors.

SUMMARY OF THE INVENTION

In accordance with principles of the present invention, these needs are met by a monolithic capacitor arranged to include both a multi-layer, lower frequency higher valued capacitor and a single layer, higher frequency lower valued capacitor. Specifically, the integrated structure includes, in a dielectric body, a series of conductive plates. Two or more plates are arranged in a substantially parallel and opposed configuration in one region of the body, to form a lower frequency, lower value capacitor therebetween. In another region of the body, a third floating plate is positioned internal in the body, parallel and opposed to the other plates, thus forming a capacitor therebetween, and also positioned relative to conductive structures electrically connected to the contacts of the capacitor, so as to form further capacitors therebetween. The resulting array of combined series and parallel capacitors formed by the third plate, in conjunction with the capacitor(s) formed by the first and second plates, provides effective wideband performance in an integrated, cost-effective structure.

In specific disclosed embodiments, the conductive structures arranged relative to the third plate, may be additional conductive plates, positioned either on an external surface of the dielectric body, or internally to the dielectric body and connected by one or more vias to plates on an external surface of the dielectric body. The conductive structures can alternatively be adjacent to the edges of the third conductive plate, such as plates confronting the third plate in an edge-to-edge fashion, thus forming a capacitor using fringing electric field coupled to the edge of said third conductive plate.

In the disclosed embodiments, the monolithic capacitor is formed of a ceramic dielectric, formed from a plurality of ceramic tape layers laminated together in a green ceramic state and fired to form a cured monolithic ceramic structure. However, other dielectric materials and assembly methods may be used. Further, in the disclosed embodiments the dielectric body has a parallelopiped shape, with electrical contacts positioned on opposed end surfaces. However, other shapes may also be used.

These embodiments, and the above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1A:
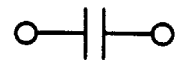
FIGS. 1A and 1B illustrate a capacitor and the known equivalent model therefor.
Figure 1B:
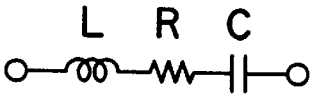
Figure 2A:
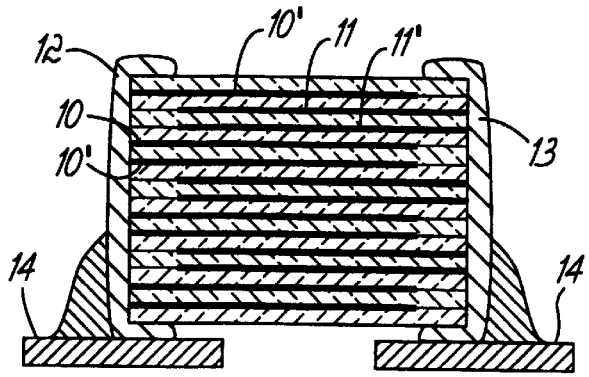
FIGS. 2A and 2B illustrate a known multilayer monolithic capacitor structure and its equivalent circuit diagram.
Figure 2B:
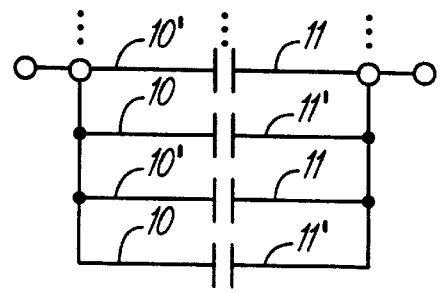
Figure 3A:
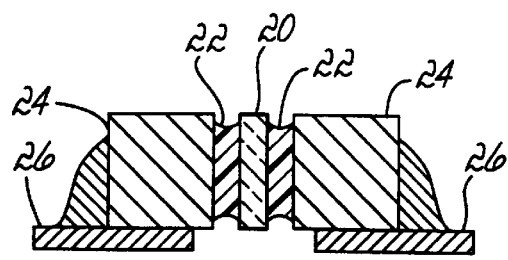
FIGS. 3A and 3B illustrate a known high frequency single layer monolithic capacitor structure and its equivalent circuit diagram.
Figure 3B:
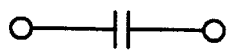
Figure 4A:
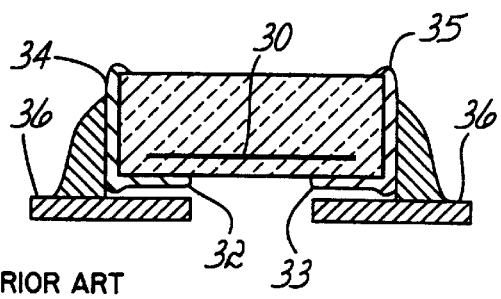
FIGS. 4A and 4B illustrate a known high frequency buried single layer monolithic capacitor structure and its equivalent circuit diagram.
Figure 4B:
Figure 9A:
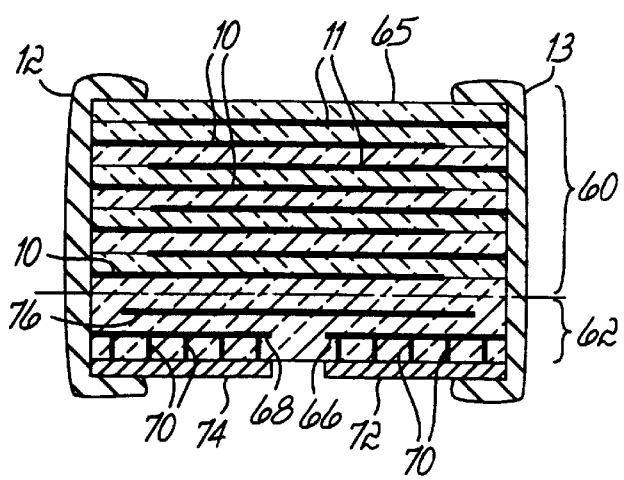
FIG. 9A illustrates a first embodiment of an integrated wideband capacitor in accordance with one aspect of the present invention.

Referring now to FIG. 9A, a first embodiment of an integrated capacitor in accordance with certain aspects of the invention, can be described. In this embodiment, an integrated multi-layer and high frequency capacitor includes an upper section 60 including a multi-layer structure similar to that discussed above with reference to FIG. 2A, including plates 10 and 11 extending from conductive contacts 12 and 13, respectively, on opposite sides of a ceramic dielectric body. In this embodiment, individual plates extend from each side contact, rather than pairs of plates as shown in FIG. 2A. Using single plates in this manner increases the series inductance and resistance, for the reason that more current is caused to flow over each individual plate; however, more plates can be included in the capacitor using single plates, allowing an increase in capacitance value. Thus, the decision to use single or multiple plates is a tradeoff between capacitance and series resistance and inductance.

In the embodiment of FIG. 9A, a high frequency capacitor is formed in a lower section 62, from two additional internal plates 66 and 68 which extend from the end contacts 13 and 12, respectively. These internal plates are connected by vias 70 to external conductive plates 72 and 74, respectively, which are printed on the exterior of the ceramic dielectric body 65. Multiple conductive paths are thus provided to the interior plates 66 and 68 to reduce series resistance. Plates 66 and 68 are capacitively coupled to a floating interior plate 76, forming a series combination of capacitances 67, 69, from plate 66 to plate 76, and from plate 76 to plate 68.

It has been found that the high frequency performance of the device of FIG. 9A is affected by the relative position of plate 76 and the nearest multi-layer plate 10 in upper section 60 of the device directly above plate 76. Accordingly, the high frequency performance is a function of the capacitance between plate 76 and the plate 10 immediately above plate 76 in the upper section 60 of the device.

Figure 8A:
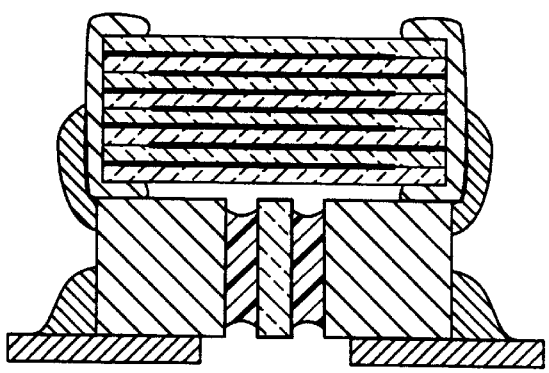
FIGS. 8A and 8B illustrate known implementations of a parallel combination of capacitors using known capacitors previously illustrated.
Figure 8B:
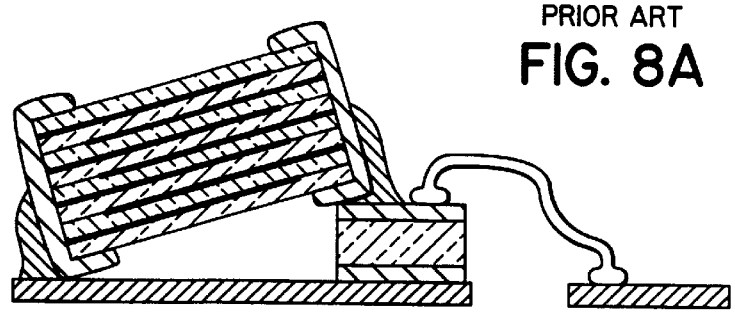
Figure 9B:
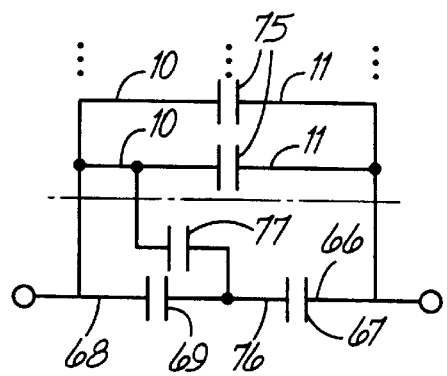
FIG. 9B illustrates an equivalent circuit diagram.

Referring to FIG. 9B, the equivalent circuit diagram of operative capacitances in the device of FIG. 9A, includes not only capacitances 67, 69, 75 between plates 66, 76 and 68, and between plates 10 and 11, respectively, but further capacitances 77 between plate 76 and plate 10 from the upper section. The multiplicity of capacitances and their interrelationship is believed to permit fine-tuning of high frequency response of the device, e.g. by tuning out resonances that cause dips in the curve of capacitance vs. frequency. When the multiple capacitors have peak performance areas that are closely spaced in the high frequency (GHz) range of operation, when combined, the result can be a flatter frequency response than is possible in prior approaches of stacking multiple discrete ceramic capacitors such as shown in FIGS. 8A and 8B.

Figure 10A:
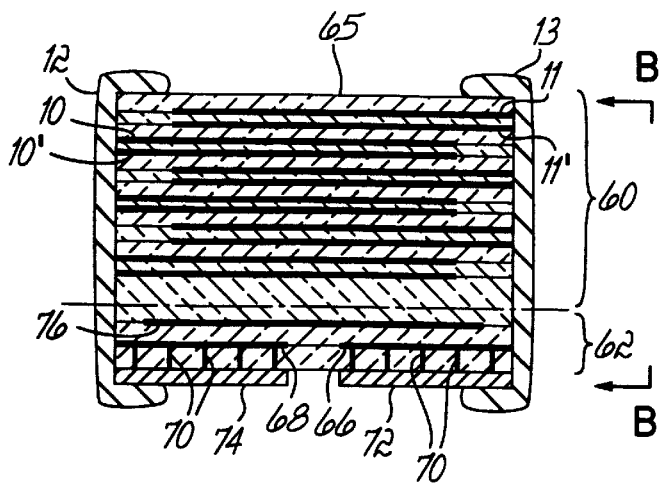
FIG. 10A illustrates a second embodiment of an integrated wideband capacitor in accordance with further aspects of the present invention.

FIG. 10A illustrates an alternative device structure that embellishes the capacitor network described in the theory of operation of the device of FIG. 9A. Specifically, in this device, the external conductive plates 72 and 74 in the lower section 62 of the device have been extended toward each other so as to create a capacitance between plates 72 and 74 based upon fringe electric field extending to and from the adjacent edges of those plates.

Also, the edges of floating internal plate 76 have been withdrawn toward the interior of the device, which has the effect of lowering the capacitance and inductance between plate 76 and plates 72 and 74. The reduced capacitance results from the reduced area of plate 76 that is opposed by plates 72 and 74. The reduced inductance results from reduced distances through which there are opposed current flows in plates 76, 72 and 74. Furthermore, the withdrawal of the plate 76, permits some direct capacitive coupling between plate 66 of the lower section 62 of the device and plate 10' of the upper section of the device, introducing an additional capacitance to the device.

Finally, in this device, dual plates have been used in the upper section 60 of the device to reduce series resistance and inductance, albeit at some expense of capacitance value. (Use of dual or single plates in upper section 60 is a possible design choice for any embodiment of the invention described here, regardless of the elements used in the lower section 62.)

Figure 10B:
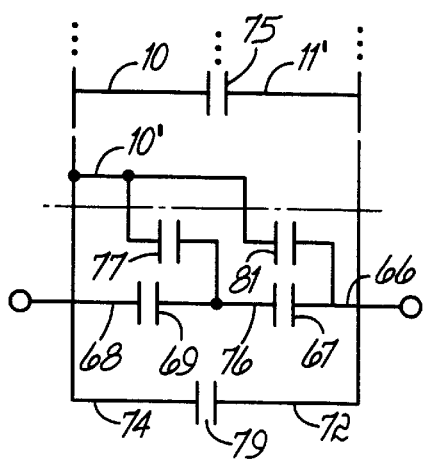
FIG. 10B illustrates an equivalent circuit diagram for this embodiment.

Thus, the equivalent circuit diagram of the device of FIG. 10A, shown in FIG. 10B, as compared to the diagram of FIG. 9B, includes an additional capacitance 79 between plates 72 and 74. This additional capacitance is shown in dotted outline in FIG. 10A, reflecting that the fringe capacitance between plates 72 and 74 may be relatively small compared to the other parallel plate capacitances in the remainder of the lower section 62 of the device. However, this capacitance may well affect the very high frequency performance of the device.

The equivalent circuit diagram of FIG. 10B is further different from FIG. 9B, in an additional capacitance 81 between plate 66 and plate 10'. This additional capacitance will provide an additional resonance that can aid in flattening the high frequency performance of the device.

Finally, in this device, dual plates have been used in the upper section 60 of the -device to reduce series resistance and inductance, albeit at some expense of capacitance value. (Use of dual or single plates in upper section 60 is a possible design choice for any embodiment of the invention described here, regardless of the elements used in the lower section 62.)

Thus, the equivalent circuit diagram of the device of FIG. 10A, shown in FIG. 10B, as compared to the diagram of FIG. 9B, includes an additional capacitance between plates 72 and 74. This additional capacitance is shown in dotted outline in FIG. 10A, reflecting that the fringe capacitance between plates 72 and 74 may be relatively small compared to the other parallel plate capacitances in the remainder of the lower section 62 of the device. However, this capacitance may well affect the very high frequency performance of the device.

The equivalent circuit diagram of FIG. 10B is further different from FIG. 9B, in an additional capacitance between plate 66 and plate 10'. This additional capacitance will provide an additional resonance that can aid in flattening the high frequency performance of the device.

The equivalent circuit diagram of FIG. 10B is still further different from FIG. 9B, in that the capacitances from plates 66 and 76 to plate 10' in the upper section 60 of the device, are independently connected to the end terminal, i.e., current flows to and from plate 10' independently of any current flow in the plates 10 and 11' which form the lowermost parallel plate capacitor in section 60 of the device. Providing an independent current flow path, via plate 10', for capacitive current flowing from plate 76, may affect the equivalent series resistance and inductance of the high frequency portion of the device and thus prove an important design feature. (It will be appreciated that an independent current path for capacitances coupled from the lower section 62 of the device, provided by a plate positioned in the manner of plate 10' in FIG. 10A, may be used in any embodiment of the invention, regardless of whether that embodiment also includes dual plates throughout the upper section 60 of the device as is the case in FIG. 10A.)

Figure 11A:
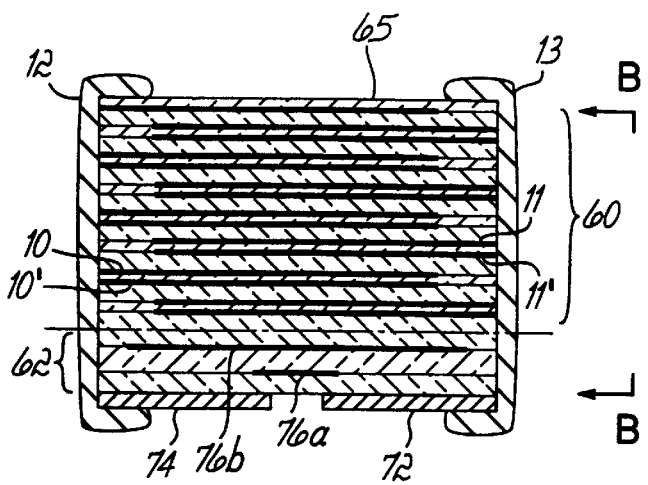
FIG. 11A illustrates a third embodiment of an integrated wideband capacitor in accordance with further aspects of the present invention.

Referring now to FIG. 11A, in a further embodiment of the invention, the upper section 60 is formed as in FIG. 10A, of plates that extend in pairs 10/10' and 11/11' from the end terminals 12 and 13. The lower section 62 includes a structure distinct from that of FIG. 10A in several respects. First, the internal plates 66 and 68 and the vias connecting those plates to external plates 72 and 74, have been eliminated. In the space occupied by plates 66, 68 and 76 in the device of FIG. 10A, are two floating plates 76A and 76B, which capacitively couple directly to the external plates 72 and 74. Plate 76A is placed closest to plates 72 and 74 and has a smaller horizontal extent than plate 76B. Capacitive coupling can thus occur, between plates 72 and 74 and plate 76A, as well as between plates 72 and 74 and plate 76B. Furthermore, plates 76A and 76B are capacitively coupled to each other. Also, plate 76B is capacitively coupled to the lowermost plate 11' of the upper section 60 of the device.

Figure 11B:
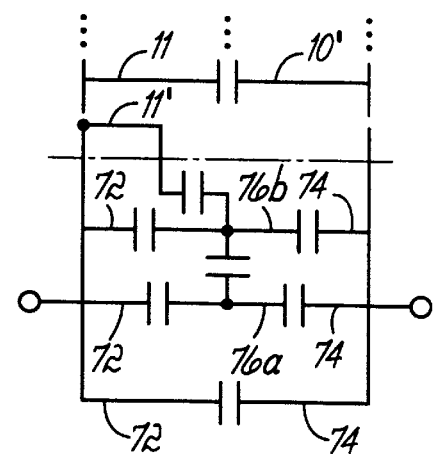
FIG. 11B illustrates an equivalent circuit diagram for this embodiment.

The resulting complex network of capacitances is shown in FIG. 11B. As can be seen, the network of capacitances provides a substantial number of capacitances that can be adjusted (e.g, by altering the size, placement or number of the floating plates 76, and the size of the plates 72 and 74), to optimize high frequency performance of the device.

Figure 12A:
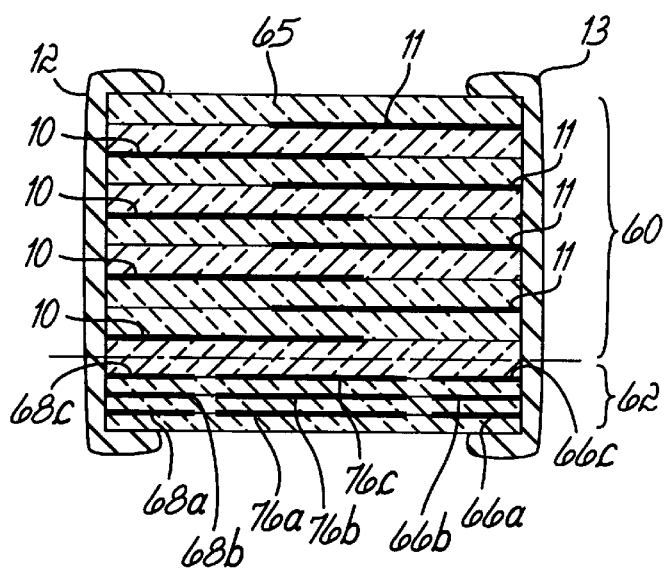
FIG. 12A illustrates a fourth embodiment of an integrated wideband capacitor in accordance with further aspects of the present invention.

A final embodiment is illustrated in FIG. 12A. In this embodiment, single plates 10 and 11 are used in the upper section of the device. However, the single plates 10 and 11 are withdrawn relative to their positions in the devices of FIGS. 9A, 10A and 11A, reducing the overlap of adjacent plates 10 and 11. As a result, the capacitance and series inductance of the capacitors in the upper section 60 of the device are reduced, due to decreased opposed area and decreased opposed current flows. Furthermore, in the lower section 62 of the device, the arrangement of plates shown in the preceding figures has been replaced with a plurality of interior plates 66A, 66B and 66C extending from terminal 13, and a plurality of interior plates 68A, 68B and 68C extending from terminal 12, each respectively opposed edge-to-edge by one of a plurality of interior floating plate 76A, 76B and 76C to, form series capacitor pairs. Furthermore, the floating plates 76A, 76B and 76C are capacitively coupled to each other, and the uppermost floating plate 76C is capacitively coupled to the lowermost plate 10 of the upper section 60 of the device. The number of floating plates 76 and interior plates 66 and 68 is subject to adjustment to achieve a desired capacitance. Furthermore, the plates 66 and 68 may be positioned on alternating layers relative to plates 76 to decrease the likelihood of breakdown paths forming along layer boundaries in the ceramic dielectric material.

Figure 12B:
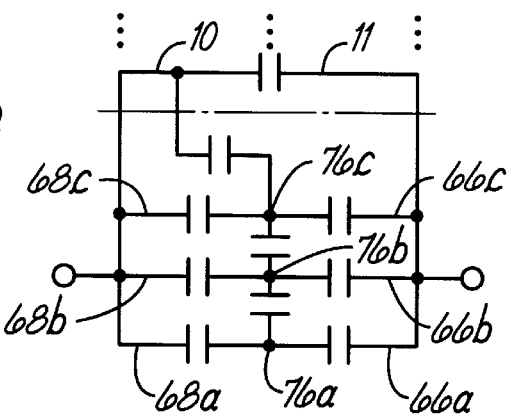
FIG. 12B illustrates an equivalent circuit diagram for this embodiment.

FIG. 12B illustrates the equivalent circuit diagram for the device of FIG. 12A. Notably, the plural interconnected series capacitor pairs in this embodiment provide, as before, a large number of capacitances that may be adjusted to optimize high frequency performance. It will be noted that additional, variable capacitances may be created by staggering the widths of the floating plates 76 relative to the plates 66 and 68 so that plates 76, 66 and 68 couple face-to-face to each other as well as through fringe fields coupled to the edges of those plates.

Figure 13:
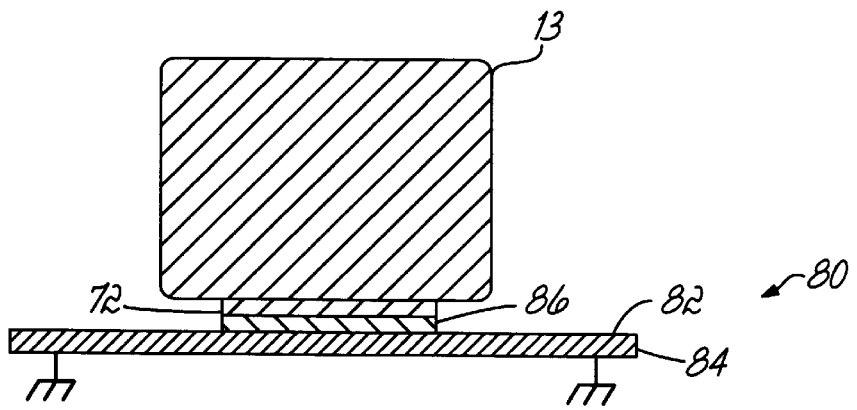
FIG. 13 is a side view of the embodiments of FIGS. 10A and 11A in accordance with further aspects of the present invention.

Referring now to FIG. 13, an end view of the devices of FIGS. 10A and 11A can be used to discuss additional high frequency optimization steps. FIG. 13 shows a device mounted to a surface mount circuit board 80, having a non-conductive outer surface 82 and a buried ground plane 84 of conductive material. Conductive traces such as 86 run along the upper surface 82 of board 80, to interconnect components such as integrated circuits, discrete capacitors, and the like. The devices of FIGS. 10A and 11A include external conductive plates 74 and 76 which may be directly mounted to these conductive traces using conductive epoxy, or wave soldering.

FIG. 13 illustrates that the width of the capacitive device may be wider the width of the conductive traces 86 formed on the circuit board 80. In this event, the external conductive plates 74 and 76 may be formed with a width that matches that of the traces 86, to avoid unintended capacitive coupling to ground plane 84 from plates 74 and 76. As seen in FIG. 13, when plates 72 and 74 (plate 72 being seen in FIG. 13) are the same width as the traces 86, no additional capacitive coupling to ground is created by plates 72 and 74. The width of the internal plates such as 66, 68, 76, 10 and 11 may be made narrow as well, but likely can be made as wide as the entire device, for the reason that plates 72 and 74 are substantially closer to ground plane 84 than the other plates internal to the device and thus are more likely to create coupling to ground.

In accordance with the foregoing, an improved capacitive device may be formed, integrating low and high frequency performance in a single device. While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Specifically, techniques described in these multiple embodiment may be combined in myriad ways beyond the particular combinations shown herein. The independently adjustable parameters in forming a device in accordance with aspects of the invention include at least (1) the use of interior plates 66 and 68, or not, (2) the distances between plates 72 and 74 and/or 66 and 68 and the fringe capacitances created thereby, (3) the number of floating plate(s) 76 and their distances to each other and to plates 72/74 or 66/68, (4) the spacing and overlap characteristics of the floating plate(s) 76 and the lowermost plates 10 or 11 of the upper section 60 of the device, (4) the width of floating plate(s) 76 and the extent to which coupling is permitted from plates 72, 74, 66 or 68 to the lowermost plates 10 or 11 of the upper section 60 of the device due to withdrawn floating plate(s) 76, (5) the use of fringe or face-to-face coupling between plate(s) 76 and plate(s) 66 and 68, and the number of plates 76, 66 and 68 used, (6) the use of dual or single plates, withdrawn or fully overlapping plates in upper section 60, and (7) the relative geometry of plates 72 and 74, or other lowermost plates in the device, and the traces 86 on the circuit board to which the device is mounted. A further potential variable to adjust, is the type of ceramic used. Indeed, different layers in the ceramic structure may be made of ceramic materials having different molecular structures. Different ceramic materials may exhibit different performance in various attributes, such as relative dielectric constant, polarization, breakdown field strength, curing behavior, mechanical strength and mechanical stress and strain behavior. For example, a relatively low dielectric ceramic having relatively good high frequency behavior may be used in the lower section 62 of a device, while a relatively high dielectric ceramic having relatively poorer high frequency behavior may be used in the upper section 60 of the device. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A monolithic capacitor, comprising
a three-dimensional dielectric body, having first and second external conductive contacts;
a first conductive plate internal to said dielectric body, extending within said body and conductively connected to said first external conductive contact;
a second conductive plate internal to said dielectric body, extending within said body and conductively connected to said second external conductive contact, wherein said first and second conductive plates are substantially parallel and opposed in at least one region of said body, to form a capacitor therebetween;
a third conductive plate internal to said dielectric body, extending within said body and not conductively connected to any external conductive contacts, wherein said second and third conductive plates are substantially parallel and opposed in at least one region of said body, to form a capacitor therebetween;
a first conductive structure electrically connected to said first external conductive contact and positioned relative to said third conductive plate to form a capacitor therebetween; and
a second conductive structure electrically connected to said second external conductive contact and positioned relative to said third conductive plate to form a capacitor therebetween.

2. The monolithic capacitor of claim 1 wherein said first conductive structure comprises a conductive plate parallel and opposed to said third conductive plate to form a capacitor therebetween.

3. The monolithic capacitor structure of claim 2 wherein said second conductive structure comprises a conductive plate parallel and opposed to said third conductive plate to form a capacitor therebetween.

4. The monolithic capacitor of claim 2 wherein said conductive plate forming said first conductive structure is positioned on an external surface of said dielectric body.

5. The monolithic capacitor of claim 2 wherein said conductive plate forming said first conductive structure is positioned interior to said dielectric body, and further comprising an external conductive plate positioned on an external surface of said dielectric body, the dielectric body defining at least one via filled with conductive material, and extending between said external conductive plate and said conductive plate forming said first conductive structure.

6. The monolithic capacitor of claim 1 wherein said first conductive structure comprises a structure extending adjacent to an edge of said third conductive plate and forming a capacitor using fringing electric field coupled to said edge of said third conductive plate.

7. The monolithic capacitor of claim 6 wherein said first conductive structure comprises a conductive plate having an edge adjacent to an edge of said third conductive plate.

8. The monolithic capacitor of claim 6 wherein said second conductive structure comprises a structure extending adjacent to an edge of said third conductive plate and forming a capacitor using fringing electric field coupled to said edge of said third conductive plate.

9. The monolithic capacitor of claim 1 wherein said dielectric body is ceramic.

10. The monolithic capacitor of claim 9 wherein said dielectric body comprises ceramic layers of different molecular structure exhibiting different performance in one or more of relative dielectric constant, breakdown field strength, curing behavior, mechanical strength and mechanical stress and strain behavior.

11. The monolithic capacitor of claim 9 wherein said ceramic body comprises a plurality of ceramic tape layers laminated together in a green ceramic state and fired to form a cured monolithic ceramic structure.

12. The monolithic capacitor of claim 1 wherein said dielectric body has a parallelopiped shape, said first and second external conductive contacts being positioned on opposed end surfaces of said parallelopiped shape.

13. The monolithic capacitor of claim 1 further comprising additional conductive plates internal to said dielectric body, extending within said body and conductively connected to said conductive contacts on respective first and second exterior surfaces thereof, wherein said additional plates are substantially parallel and arranged in opposed pairs in at least one region of said body, the respective plates in each pair extending from respective ones of said contacts, to form additional capacitors.

14. The monolithic capacitor of claim 1 wherein said third conductive plate is substantially coextensive with said first and second conductive plates.

15. The monolithic capacitor of claim 1 wherein said third conductive plate is substantially smaller in at least one dimension of its planar surfaces, than the first and second conductive plates.

16. The monolithic capacitor of claim 1 further comprising a fourth conductive plate adjacent to and substantially parallel to said third conductive plate, positioned relative to said first conductive structure to form a capacitor therebetween, and positioned relative to said third conductive plate to form a capacitor therebetween.

17. The monolithic capacitor of claim 1 mounted to a conductive trace on a circuit board, the conductive trace extending along its length to a point of contact with said monolithic capacitor, said monolithic capacitor resting across the width of said trace,
  wherein said first and second conductive structures are substantially equal to or less in width than said conductive trace.

* * * * *

UNITED STATES PATENT AND TRADEMARK OFFICE
CERTIFICATE OF CORRECTION

PATENT NO. : 6,587,327 B1
DATED : July 1, 2003
INVENTOR(S) : Devoe et al.

It is certified that error appears in the above-identified patent and that said Letters Patent is hereby corrected as shown below:

Column 1,
Line 39, "over frequency in accordance with this" should read -- over frequency. In accordance with this --.

Column 2,
Line 49, "there is only on capacitor in" should read -- there is only one capacitor in --.

Figure 5A:
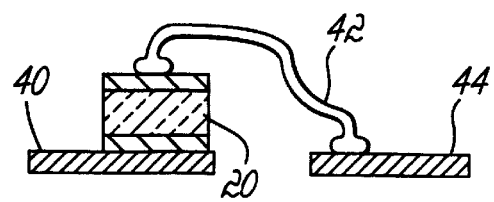
FIGS. 5A and 5B illustrate a known high frequency single layer monolithic capacitor structure and its equivalent circuit diagram.
Figure 5B:
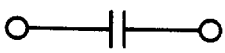
Figure 6A:
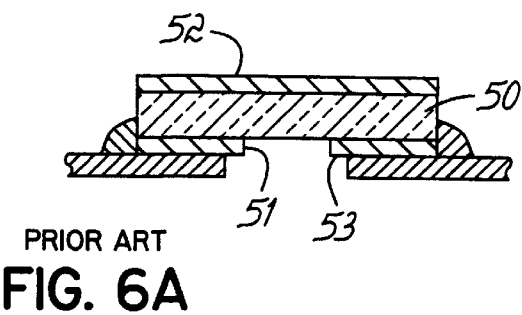
FIGS. 6A and 6B illustrate a known high frequency single layer monolithic capacitor structure and its equivalent circuit diagram.
Figure 6B:
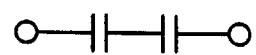
Figure 7:
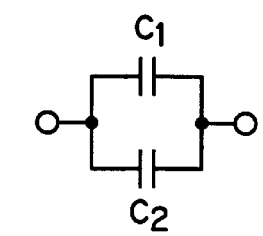
FIG. 7 illustrates a circuit diagram of a known parallel combination of capacitors to form a wideband capacitor.

Column 3,
Line 5, "through wire bond, to the" should read -- through wire bond 42, to the --.
Line 7, "equivalent circuit diagram, and" should read -- equivalent circuit diagram (FIG 5B), and --.
Line 10, "a series capacitor has been" should read -- a series capacitor (FIG 6B) has been --.
Line 34-35, "whereas a higher frequencies, where C1 behaves increasing" should read -- whereas at higher frequencies, where C1 behaves increasingly --.

Column 4,
Line 64, "DRAWING" should read -- DRAWINGS --.

Column 5,
Line 44, "FIG. 13 is a side view of" should read -- FIG. 13 is an end view of --.

Column 7,
Lines 10-31, delete the 3 duplicate paragraphs beginning with "Finally, in this device".

Column 8,
Line 21-22, "floating plate 76A, 76B and 76C to, form" should read -- floating plates 76A, 76B, 76C to form --.
Line 52, "conductive plates 74 and 76 which may" should read -- conductive plates 72 and 74 which may --.
Line 56, "device may be wider the width of the" should read -- device may be wider than the width of the --.
Lines 58 and 60, "plates 74 and 76" should read -- plates 72 and 74 --.

UNITED STATES PATENT AND TRADEMARK OFFICE
CERTIFICATE OF CORRECTION

PATENT NO.   : 6,587,327 B1
DATED        : July 1, 2003
INVENTOR(S)  : Devoe et al.

It is certified that error appears in the above-identified patent and that said Letters Patent is hereby corrected as shown below:

Column 9,
Line 12, "these multiple embodiment may be" should read -- these multiple embodiments may be --.
Lines 16-30, the numbered list (1) through (7) contains two number (4)s and should be renumbered (1) through (8).

Signed and Sealed this

Second Day of August, 2005

JON W. DUDAS
*Director of the United States Patent and Trademark Office*